Feb. 26, 1963 R. H. WALKER 3,078,900
FLANGED NUT WITH REINFORCED DEFLECTING PRONGS
Filed Nov. 2, 1959
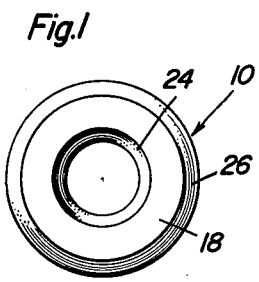
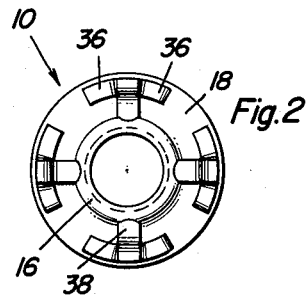
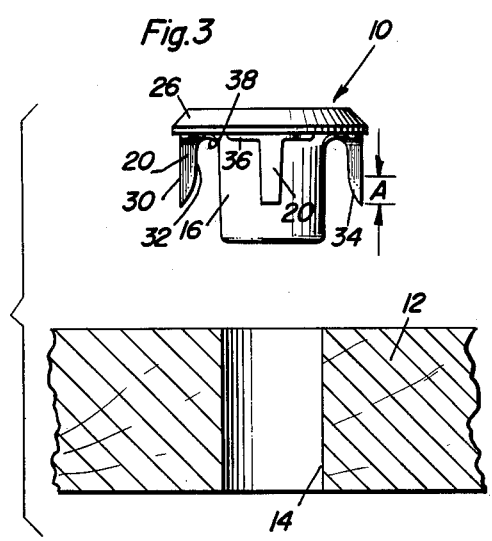
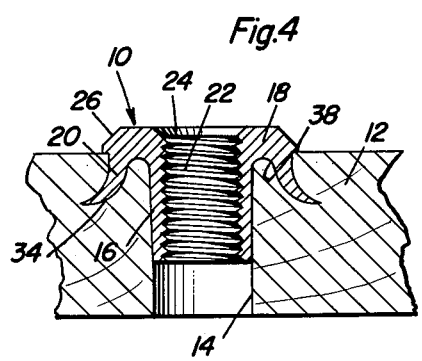
Robert H. Walker
INVENTOR.

United States Patent Office 3,078,900
Patented Feb. 26, 1963

3,078,900
FLANGED NUT WITH REINFORCED
DEFLECTING PRONGS
Robert H. Walker, P.O. Box 89, Lewisburg, Tenn.
Filed Nov. 2, 1959, Ser. No. 850,151
1 Claim. (Cl. 151—41.73)

This invention comprises a novel and useful furniture stay nut and more particularly pertains to a nut adapted to be securely anchored or embedded in a piece of wood such as furniture to facilitate the application of fasteners such as cap screws thereto.

The primary object of this invention is to provide a stay nut of such construction that it may be readily and easily secured in a bore provided in a piece of wood in such a manner as to secure the nut against rotation when it is engaged by a fastener such as a screw and to prevent withdrawal of the nut.

A further object of the invention is to provide a construction of a stay nut in accordance with the preceding object wherein the prongs of the nut shall have a particular configuration to effect easy penetration of wood without splitting the same and to effect ready bending of the prongs during their penetration into the wood so as to secure a firm permanent locking action of the prongs in the wood.

Yet another object of the invention is to provide a stay nut in accordance with the foregoing objects wherein the head of the nut shall be of a sufficient thickness to prevent deformation of the same during driving of the nut into a bore in a piece of wood and during the penetration of the prongs into the wood.

Still another object of the invention is to provide a stay nut in accordance with the above mentioned objects in which reinforcing elements of an integral character may be easily and economically formed in the body of the nut and in the connection of the prongs thereto whereby to prevent bending of the prongs except in a desired radially outward direction from the barrel of the nut and whereby these ribs also serve as anchoring means to prevent rotation of the nut after the same has been properly seated in the bore.

A further and very important object of the invention is to provide a stay nut construction in accordance with the preceding objects wherein the prongs of the nut shall have a configuration and construction particularly adapted to cause bending of the prongs in a continuous and continuing curve as the same are embedded into the wood during the driving of the nut into a bore whereby to obtain the optimum holding action of the prongs in the wood with a minimum tendency of the prongs to split the wood during such penetration.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of a stay nut in accordance with this invention;

FIGURE 2 is a bottom plan view of the same;

FIGURE 3 is a group assembly view shown in vertical section a portion of wood with a bore therethrough adapted to receive a stay nut with the latter being shown in side elevation prior to its insertion into the bore of the wood; and FIGURE 4 is a view in vertical transverse section through a piece of wood having a bore and with a stay nut in accordance with this invention properly seated in the bore and anchored and interlocked in the wood.

Although not necessarily limited thereto, the particular stay nut forming the subject matter of this invention is specifically adapted to meet the exacting requirements of furniture manufacturers and dealers for the provision of a nut which may be permanently secured in a bore in a piece of furniture and will provide an anchor for receiving a screw or bolt by which various portions of the furniture may be detachably secured thereto.

Among the essential requirements for a nut of this character are the necessities of ready and easy application of the nut into a bore provided in the furniture; the seating of the nut in the bore in such a manner as to preclude possible turning of the nut in the bore once the same has been installed; the provision of sufficient rigidity and resistance to deformation in the head of the nut to enable it to be successfully and conveniently driven into place in the bore with the hammer and the like without marring the nut or its anchoring prongs; and a prong structure of such configuration and proportions on the nut that the prongs will readily bend as the nut is seated in the bore so that they will penetrate the wood adjacent the bore in a firm and secure manner to establish a permanent anchoring of the nut to the wood but without danger of splitting the wood during such penetration.

The stay nut of the present invention obtains the above set forth requisite qualities by virtue of the particular configuration and proportions imparted to the various components of the nut in a manner to be now described.

In the accompanying drawings, the stay nut in accordance with this invention is designated generally by the numeral 10 and is adapted to be applied to a piece of wood 12 which may form a portion of furniture or the like and which is provided with the usual drilled bore 14 into which the nut is to be seated.

The stay nut 10 consists of a generally cylindrical barrel 16 together with a diametrically enlarged circular head portion 18 at one end thereof while a plurality of deformable prongs 20 depend from the head portion 18 in peripherally spaced relation about and parallel to the barrel 16 and slightly inwardly from the periphery of the head portion.

The nut is preferably cast or otherwise fabricated from a suitable material and is of integral construction, the barrel 16 being generally cylindrical and having an internally threaded bore 22 therethrough for the purpose of receiving the usual detachable fastener which cooperates with the nut and serves to secure together various components of furniture in a readily detachable manner.

At the upper end of the threaded portion 22 where the threaded bore emerges through the top surface of the head 18, this bore is beveled in a manner which is upwardly and outwardly divergent as shown at 24 in FIGURE 4 in order to provide a funnel shaped upwardly flaring guide surface which may facilitate the engagement of a fastener with the threaded internal bore of the barrel of the nut and prevents battering of the threads by the driving tool.

The head 18 is preferably of circular configuration being of greater than usual thickness in a direction which is parallel to the longitudinal axis of the barrel of the nut in order to provide sufficient material in the head 18 to enable the latter to withstand blows as the nut is driven into seated position as shown in FIGURE 4 without danger of deforming the head portion of the nut. Preferably, the outer edge of the head portion is beveled as at 26 in order to decrease the possibility of the nut being struck and dislodged from its seated position in the piece of wood 12 after the nut has been properly forced into place.

The bottom end of the bore 22 may be beveled in the same manner as 24 to facilitate starting of a screw from the other end if desired.

A further important characteristic of this nut is that the barrel 16 is of considerably greater length than that of the prongs 20 being preferably in the order of one and one-half times the length of the prongs. The purpose served by this greater relative length of the barrel is that a firm and secure guiding action is imparted to the entire nut as the latter is driven into the wood 12 with the barrel having a relatively large area of contact with the wall of the bore 14 during the insertion of the barrel into the bore to thus ensure a straight travel of the nut regardless of the direction of the grain of the wood into which the prongs are forced. Thus, the barrel serves as a guide to center the nut during its insertion thereby ensuring that the prongs will be uniformly deformed and spread outwardly from the barrel to secure the maximum gripping action as indicated in FIGURE 4.

It is also to be observed that each of the prongs 20 is of a particular configuration, whereby the radially outer surface of the prongs, that is the surface which is most remote from the barrel 16 is disposed in parallel relation to the barrel as indicated at 30 in FIGURE 3. Thus the circumferentially outer surfaces of the prongs are all parallel to the barrel prior to deformation of the prongs during the insertion of the nut into the wood.

The radially inner surface of the prongs, however, on the other hand, is of a particular contour to be now described. Thus, the upper portion of the prong as shown at 32 is substantially straight and parallel to the outer surface 30 and this upper portion of each prong is of substantially uniform cross-sectional area and shape. This portion of uniform cross-sectional area extends substantially one-half of the length of the prong and the lower portion of each prong is provided with a continuously curved or cam surface 34 which at its lower end merges into the point on the prong. Thus, the curved or cam surface on the prong, as indicated by A in FIGURE 3 is about one-half of the length of the remaining portion of the prong.

As a result of this configuration, when the nut is driven into the wood as shown in FIGURE 4, the camming surfaces 32 on the inside surface of the prongs will serve to cam or force the prongs outwardly from the barrel with the points of the prongs thus penetrating into the wood along a continuous curve. The reduction of the cross-sectional area of the prongs along the region A of their length enables satisfactory deformation and bending of the points of the prongs without danger of their breaking and also causes the prongs to penetrate the wood without danger of splitting the wood in this area.

A further important feature of the prong and head construction of the nut in accordance with this invention, as shown in FIGURE 2 is that at the base of the prongs, that is, at the region where the prongs join the head portion 18, there are provided reinforcing ribs for each of the prongs. Thus, upon the circumferentially opposite sides of each prong where it joins the head 18 there are provided arcuately extending oppositely positioned integral ribs or bosses 36 which may have a knife edge if desired and which as they project below the flat bottom surface of the head 18 may be caused to penetrate to some extent the surface of the wood 12 and thus anchor the nuts against turning in the bores 14. Further, these prongs being integrally engaged with the opposite circumferentially spaced side edges or portions of the prongs reinforce the latter and prevent the prongs from bending along or in a direction of the circumference of the head of the nut. There is further provided an integral radially extending rib 38 between each nut prong 20 and the barrel 16 thereof. As will be apparent from FIGURE 3 as well as FIGURE 4, the radially extending integral rib 38 has a recess or rounded undersurface so that the maximum thickness of material is presented where the rib joins the prong 20 and where it joins the barrel 16. The result of this construction is that any tendency of the prong to be deformed towards the rib will be opposed by the strengthening and rigidifying effect of this rib, while the tendency of the prong to deform outwardly from the barrel under the influence of the camming surfaces 34, will in no way be hindered by this reinforcing rib.

It will thus be apparent there has been provided a one-piece integral construction of a stay nut having deformable anchoring prongs together with the provision of integral reinforcing means which will prevent to the maximum extent any bending of the prongs except at a direction radially away from the barrel of the nut, and whereby the shape of the prongs is such that a camming surface is provided which will afford a tendency of the prongs to be uniformly deformed along a continuous smooth curve away from the barrel as the prongs are inserted into a wooden member.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A stay nut for anchoring in a bore in a wooden article comprising a cylindrical tubular barrel having throughout its length an internally threaded bore, said barrel having a diametrically enlarged flat unbroken and circular head at one end thereof and having a plurality of deformable pointed prongs of approximately one-half the length of said barrel and depending from and spaced inwardly from the periphery of said head and extending in parallelism to said barrel, said barrel being of greater length and extending beyond the points of said prongs whereby to provide an increased bearing and guiding action for the nut as the barrel is inserted in the bore and the prongs are inserted into the material of a wooden article, said prongs having flat outer surfaces which are parallel along their entire length to the axis of the barrel, said prongs having the upper portion of their inner surface the barrel being parallel to said outer surfaces with the upper portion of each prong being of uniform cross-sectional area, the lower portion of each prong having its inner surface adjacent said barrel smoothly and continuously curving from said upper portion downwardly and towards said outer surface and merging into the latter at the lower end of the prong thereby to progressively decrease the radial thickness of said prong from said upper portion downwardly and to provide a cam surface deforming the prong outwardly from the barrel when the nut is seated in a bore in a wooden article, the length of said cam surface being less than that of the upper portion of uniform cross-sectional area, said head being of sufficient thickness and said barrel bore being beveled in said head to prevent deformation of said head and barrel bore as said barrel is driven into said wood bore, integral ribs joining the underside of said head and the upper portion of each prong on three sides of the latter whereby to resist deformation of said prong in any direction except radially outwardly from said barrel, one of said ribs integrally joining said barrel and said inner surface, the remaining ribs extending circumferentially from the sides of said sides of said prong and the underside of said head, the underside of said integral rib being concave and said integral rib being thickened at its junction with the barrel and prong.

References Cited in the file of this patent

UNITED STATES PATENTS

| | | |
|---|---|---|
| 67,071 | Postawka | July 23, 1867 |
| 1,176,456 | Hutter | Mar. 21, 1916 |
| 2,120,711 | Phillips | June 14, 1938 |

FOREIGN PATENTS

| | | |
|---|---|---|
| 923,486 | France | Feb. 17, 1947 |
| 1,063,775 | France | Dec. 16, 1953 |